United States Patent
Jreij et al.

(10) Patent No.: US 10,754,955 B2
(45) Date of Patent: Aug. 25, 2020

(54) AUTHENTICATING A BOOT PATH UPDATE

(71) Applicant: DELL PRODUCTS, L.P., Round Rock, TX (US)

(72) Inventors: Elie A. Jreij, Pflugerville, TX (US); Eugene D. Cho, Austin, TX (US); Mukund P. Khatri, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 423 days.

(21) Appl. No.: 15/668,955

(22) Filed: Aug. 4, 2017

(65) Prior Publication Data

US 2019/0042754 A1   Feb. 7, 2019

(51) Int. Cl.
| | |
|---|---|
| *G06F 21/57* | (2013.01) |
| *G06F 21/44* | (2013.01) |
| *H04L 9/32* | (2006.01) |
| *H04L 9/08* | (2006.01) |
| *G06F 9/4401* | (2018.01) |

(52) U.S. Cl.
CPC ........... *G06F 21/575* (2013.01); *G06F 21/44* (2013.01); *H04L 9/083* (2013.01); *H04L 9/3247* (2013.01); *G06F 9/4401* (2013.01); *H04L 9/08* (2013.01)

(58) Field of Classification Search
CPC ...... G06F 21/44; G06F 21/575; G06F 9/4401; H04L 9/08; H04L 9/083; H04L 9/3247
See application file for complete search history.

(56) References Cited

U.S. PATENT DOCUMENTS

| | | | |
|---|---|---|---|
| 8,898,654 B2 | 11/2014 | Young et al. | |
| 9,218,178 B2 | 12/2015 | Young et al. | |
| 9,483,246 B2 | 11/2016 | Prakash et al. | |
| 2010/0077066 A1* | 3/2010 | Chawla | G06F 9/4416 709/222 |
| 2014/0047428 A1* | 2/2014 | Prakash | G06F 21/572 717/168 |
| 2014/0068585 A1* | 3/2014 | Young | G06F 8/65 717/168 |
| 2015/0379306 A1 | 12/2015 | Zimmer et al. | |
| 2016/0232356 A1 | 8/2016 | Barkelew et al. | |
| 2018/0341584 A1* | 11/2018 | Letey | G06F 12/0661 |

* cited by examiner

Primary Examiner — Terrell S Johnson
(74) Attorney, Agent, or Firm — Isidore PLLC

(57) ABSTRACT

A method and an information handling system (IHS) for authenticating boot path updates in an IHS. The method includes initializing, by an image loader of the IHS, a current boot path associated with a first image. The method also includes detecting, by a processor of the IHS, detecting an attempt to update the current boot path to utilize a second image that is different from the first image. The method further includes, in response to detecting the attempt to update the current boot path, initializing a pre-authentication process to authenticate the second image. The method further includes, in response to the pre-authentication process authenticating the second image, updating the current boot path to utilize the second image and enabling a subsequent boot of the IHS using the second image.

18 Claims, 5 Drawing Sheets

AUTHENTICATING A BOOT PATH UPDATE

BACKGROUND

1. Technical Field

The present disclosure generally relates to information handling systems and in particular to authenticating updates to a boot path in an information handling system.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Conventional information handling systems (IHSs) include firmware to enable interaction between hardware and software (including other firmware) within the IHS. This firmware may include Unified extensible firmware interface (UEFI) firmware. UEFI is a specification that defines a software interface between an operating system and platform firmware of the IHS. UEFI replaces the basic input/output system (BIOS) found on older information handling systems. UEFI provides a standard architecture and data structure to manage initialization and configuration of devices, booting of platform resources, and passing of control to the operating system.

The UEFI specification provides a Secure Boot process that authenticates images when switching between bootable images. In modern IHSs, redundant bootable images are commonly used together to prevent the execution of root kits. Additionally, it may be desirable to switch between bootable images for a variety of reasons, such as, to enter a recovery image or to perform firmware updates to the system. In order to implement Secure Boot to switch between a current boot image and a new boot image, the IHS must first be rebooted. Then, during the reboot operation (or during a next initial boot operation following a full power-off and restart) of the IHS, the new boot image is utilized/accessed in place of the original boot image, and a Secure Boot utility in the UEFI firmware attempts to authenticate the new boot image. If the new boot image is authenticated, the boot process of the IHS is allowed to proceed. However, if the new boot image cannot be authenticated during the secure boot process (due to corruption, for example), the IHS is left in a non-operational state. Corrective measures will then have to be implemented, post-failure of the system boot-up operation, including booting the system in a non-authenticated state or maintenance mode.

BRIEF SUMMARY

Disclosed are a method and an information handling system (IHS) for authenticating a boot path update in an IHS.

According to one embodiment, the method includes initializing, by an image loader of the IHS, a current boot path associated with a first image. The method also includes detecting, by a processor of the IHS, an attempt to update the current boot path to utilize a second image that is different from the first image. The method further includes, in response to detecting the attempt to update the current boot path, initializing a pre-authentication process to authenticate the second image prior to attempting to switch bootable images of the current boot path. The method further includes, in response to the pre-authentication process authenticating the second image, modifying the pointer of the image/boot loader to point to the new image and triggering a re-boot of the IHS during which the second image is accessed and loaded for operation of the IHS.

According to another embodiment, the IHS includes a memory having a plurality of images, including a first image. The IHS also includes an image loader that initializes a current boot path that is associated with the first image. The IHS further includes a processor that detects an attempt to update the current boot path to utilize a second image that is different from the first image. The processor, in response to detecting the attempt to update the current boot path, initializes a pre-authentication process to authenticate the second image prior to attempting to switch bootable images of the current boot path. In response to the pre-authentication process authenticating the second image, the processor modifies the pointer of the image/boot loader to point to the new image and triggers a re-boot of the IHS during which the second image is accessed and loaded for operation of the IHS.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
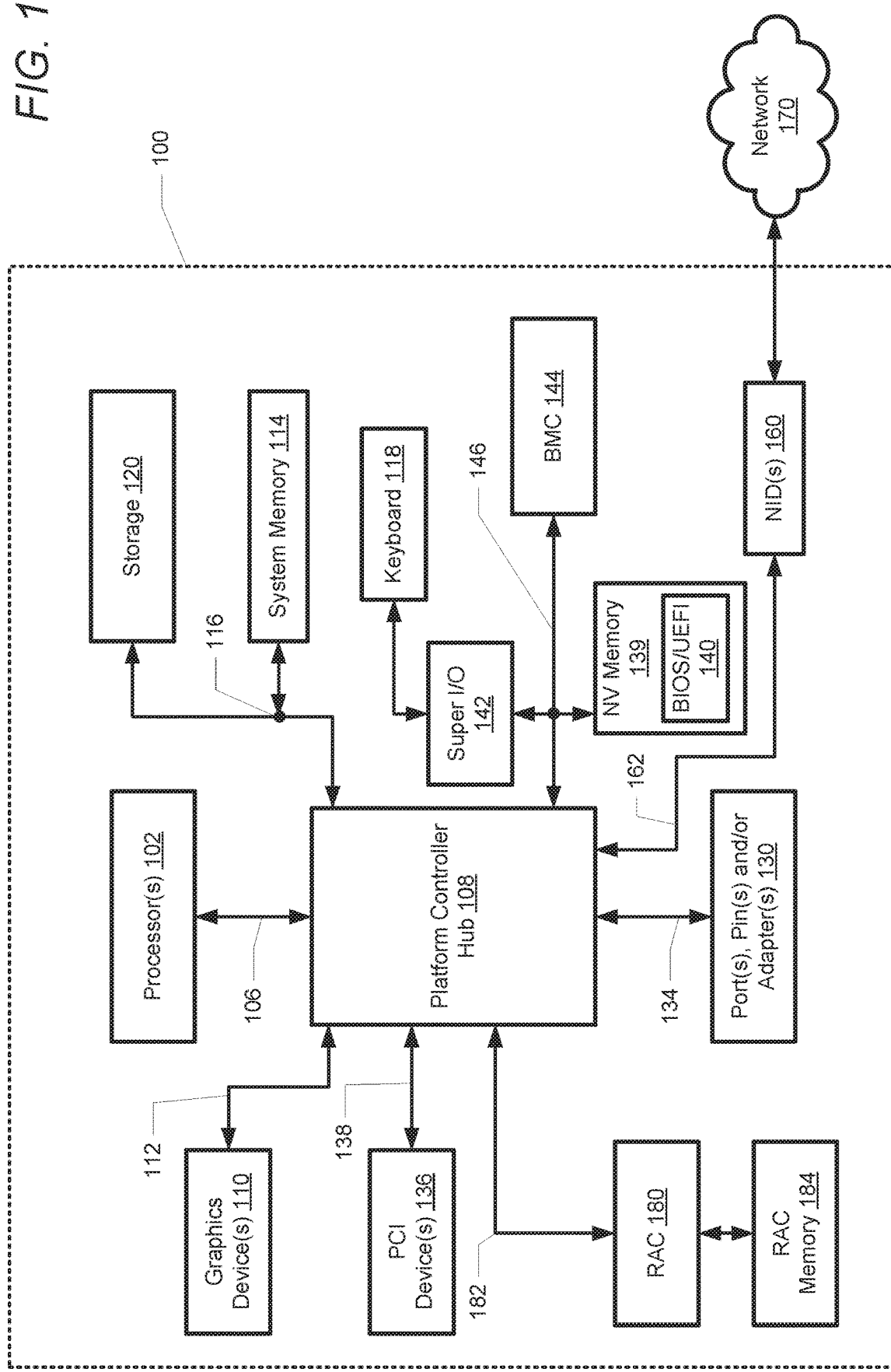
FIG. 1 illustrates one example of an IHS within which various aspects of the disclosure can be implemented, according to one or more embodiments.

The illustrative embodiments provide a method and an information handling system (IHS) for authenticating boot path updates in an IHS.

The method includes initializing, by an image loader of the IHS, a current boot path associated with a first image. The method also includes detecting, by a processor of the IHS, an attempt to update the current boot path to utilize a second image that is different from the first image. The method further includes, in response to detecting the attempt to update the current boot path, initializing a pre-authentication process to authenticate the second image prior to attempting to switch bootable images of the current boot path. The method further includes, in response to the pre-authentication process authenticating the second image, modifying the pointer of the image/boot loader to point to the new UEFI image and triggering a re-boot of the IHS during which the second image is accessed and loaded for operation of the IHS.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

As utilized herein, a boot path refers to a target image, such as an operating system image, that is currently pointed to by an image/boot loader of an information handling system. In one or more embodiments, the target image is a UEFI image. In other embodiments, the target image may be a non-UEFI image, such as an image utilized by a Baseboard Management Controller (BMC) or an image associated with a particular device having one or more images. The target image is configured as a primary boot option of the information handling system. Another new/updated image can be added to the IHS to replace the target image. However, the disclosure ensures that the new image is first authenticated and confirmed as an authentic update before the pointer of the image/boot loader is changed to point from a current (original) image to the new image. In one embodiment, the authentication of the new image occurs during a next boot-up of the IHS, and involves as processes within the next boot-up of the IHS: (i) booting/re-booting the IHS in a secure state using the original target image; (ii) performing a secure authentication process on the new image; and (iii) in response to the new image being authenticated, modifying the pointer of the image/boot loader to point to the new image and triggering a re-boot of the IHS during which the new image is accessed and loaded for operation of the IHS. In another embodiment, the authentication of the new image occurs at runtime of a current image, and involves a processes within the runtime of the current image: (i) performing a secure authentication process on the new image; and (ii) in response to the new image being authenticated, modifying the pointer of the image/boot loader to point to the new image and triggering a re-boot of the IHS during which the new image is accessed and loaded for operation of the IHS.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, an example of an IHS 100 is shown. IHS 100 includes one or more processor 102. In various embodiments, IHS 100 may be a single-processor system including one processor 102. In another embodiment, IHS 100 is a multi-processor system and processor 102 includes two or more processors (e.g., two, four, eight, or any other suitable number). Processor 102 includes any processor capable of executing program instructions.

Processor 102 is coupled to a chipset or platform controller hub (PCH) 108 via front-side bus 106. PCH 108 may be configured to coordinate I/O traffic between processor 102 and other components. For example, in this particular implementation, PCH 108 is coupled to various IHS components such as graphics device(s) 110 (e.g., one or more video cards or adaptors, etc.) via graphics bus 112 (e.g., an Accelerated Graphics Port or AGP bus, a Peripheral Component Interconnect (PCI) bus, etc.). PCH 108 is also coupled to system memory 114 via system bus 116. System memory 114 may be configured to store program instructions and/or data, accessible by processor 102. In various embodiments, system memory 114 may be implemented using any suitable memory technology, such as static RAM (SRAM), synchronous dynamic RAM (SDRAM), nonvolatile/Flash-type memory, or any other type of memory.

PCH 108 is coupled by system bus 116 to storage device or storage 120 within which can be stored one or more software and/or firmware modules and/or data (not specifically shown). In one embodiment, storage 120 can be a hard drive or a solid-state drive. The one or more software and/or firmware modules within storage 120 can be loaded into system memory 114 during operation of IHS 100.

PCH 108 is also coupled to one or more PCI devices 136 (e.g., modems, network cards, sound cards, video cards, shared memory etc.) via PCI bus 138. PCH 108 is further coupled to port(s), pin(s), and/or adapter(s) 130 over input/output (I/O) bus 134. Generally, PCH 108 may be configured to handle various I/O operations, and PCH 108 may provide interfaces such as, for instance, Universal Serial Bus (USB), audio, serial, parallel, Ethernet, and other interfaces, via port(s), pin(s), and/or adapter(s) 130 over I/O bus 134. For example, PCH 108 may be configured to allow data to be exchanged between IHS 100 and other devices, such as other IHSs attached to a network. In various embodiments, PCH 108 may support communication via wired or wireless general data networks, such as any suitable type of Ethernet network, via telecommunications/telephony networks, such as analog voice networks or digital fiber communications networks, via storage area networks (SAN) such as Fiber Channel SANs, or via any other suitable type of network and/or protocol.

PCH 108 may also enable connection to one or more input devices, such as keyboards, keypads, touch screens, scanning devices, voice or optical recognition devices, or any other devices suitable for entering or retrieving data. Multiple I/O devices may be present in association with IHS 100. In some embodiments, I/O devices may be separate from IHS 100 and may interact with IHS 100 through a wired or wireless connection. PCH 108 is coupled to a non-volatile (NV) storage or NV memory device 139 via Low Pin Count (LPC) bus 146. NV memory 139 stores a basic input output system/unified extensible firmware interface (BIOS/UEFI) 140. PCH 108 is also coupled to super I/O Controller 142 and baseboard management controller (BMC) 144 via LPC bus 146.

In another embodiment, LPC bus 146 can be a peripheral component interconnect express (PCIe) bus that utilizes a management component transport protocol (MCTP). MCTP is a bus protocol that supports communications between different intelligent hardware components that make up a platform management subsystem. MCTP further provides monitoring and control functions. The MCTP protocol is independent of the underlying physical bus properties, as well as the data link layer messaging used on the bus. The MCTP communication model includes a message format, transport description, message exchange patterns, and operational endpoint characteristics. PCIe MCTP allows BMC 144 to communicate with various components or devices of IHS 100 such as graphics devices 110, storage 120, PCI devices 136 and NID(s) 160.

BIOS/UEFI 140 includes program instructions stored thereon typically as BIOS or UEFI images. Those instructions may be usable by processor 102 to initialize and test other hardware components and/or to load an Operating System (OS) onto IHS 100. As such, (BIOS/UEFI) 140 may include a firmware interface that allows processor 102 to load and execute certain firmware, as described in more detail below. In some cases, such firmware may include program code that is compatible with the Unified Extensible Firmware Interface (UEFI) specification, although other types of firmware may be used.

IHS 100 further includes a baseboard management controller (BMC) 144 that is in communication with NV memory 139, which can have program instructions stored thereon that are usable by processors(s) 102 to enable remote management of IHS 100. For example, BMC 144 may enable a user to discover, configure, and manage BMC 144, setup configuration options, resolve and administer hardware or software problems, etc. Additionally, or alternatively, BMC 144 may include one or more BMC firmware volumes, each volume having one or more firmware files used by the UEFI firmware interface to initialize and test components of IHS 100. IHS 100 also includes a super I/O controller 142 that combines interfaces for a variety of lower bandwidth or low data rate devices, such as keyboard 118. Those devices may also include, for example, floppy disks, parallel ports, a mouse, and other devices.

In some cases, IHS 100 may be configured to access different types of computer-accessible media separate from system memory 114. Generally speaking, a computer-accessible memory device may include any tangible, non-transitory storage media or memory media such as electronic, magnetic, or optical media (e.g., magnetic disk, a hard drive, a CD/DVD-ROM, a Flash memory, etc.) coupled to IHS 100 via PCH 108. Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

IHS 100 further includes one or more network interface devices (NID(s)) 160 coupled to PCH 108 via PCI bus 162. NID(s) 160 enables IHS 100 to communicate and/or interface with other devices, services, and components that are located external to IHS 100. These devices, services, and components can interface with IHS 100 via an external network, such as example network 170, using one or more communication protocols. In one embodiment, a customer provisioned system/platform can comprise multiple devices located across a distributed network, and NID 160 enables IHS 100 to be connected to these other devices. Network 170 can be a local area network, wide area network, personal area network, and the like, and the connection to and/or between network 170 and IHS 100 can be wired or wireless or a combination thereof. For purposes of discussion, network 170 is indicated as a single collective component for simplicity. However, it is appreciated that network 170 can comprise one or more direct connections to other devices as well as a more complex set of interconnections as can exist within a wide area network, such as the Internet.

IHS 100 further includes a remote access controller (RAC) 180 coupled via PCI bus 182 to PCH 108. RAC 180 provides management functions that allow an administrator to remotely deploy, monitor, manage, configure, update, troubleshoot, and remediate IHS 100. RAC 180 is also coupled to RAC memory 184. In one embodiment, RAC memory 184 can be shared with processor 102.

RAC 180 monitors and controls the operation of IHS 100 and other systems and devices communicatively coupled to IHS 100. RAC 180 can also perform configuration and remote control of other connected IHSs. Certain software and/or firmware modules stored in RAC memory 184 can be executed by RAC 180. Processor 102 and RAC 180 include specific firmware that enables processor 102 and RAC 180 to perform the various functions described herein.

In an embodiment, a motherboard (not specifically shown) is provided that is configured to provide structural support, power, and electrical connectivity between the various aforementioned components. Such a motherboard may include multiple connector sockets in various configurations, adapted to receive pluggable circuit cards, component chip packages, etc.

A person of ordinary skill in the art will appreciate that IHS 100 is merely illustrative and is not intended to limit the scope of the disclosure described herein. In particular, any computer system and/or device may include any combination of hardware or software capable of performing certain operations described herein. For instance, although IHS 100 is illustrated following a first type architecture, various systems and methods described herein may be adapted to work with any other architecture having a different chipset and/or RAC configuration. In other implementations, one or more of the devices or components shown in FIG. 1 may be absent, or one or more other components may be added. Accordingly, systems and methods described herein may be implemented or executed with other computer system configurations. In addition, the operations performed by the illustrated components may, in some embodiments, be performed by fewer components or distributed across additional components. Similarly, in other embodiments, the operations of some of the illustrated components may not be performed and/or other additional operations may be available.

Figure 2:
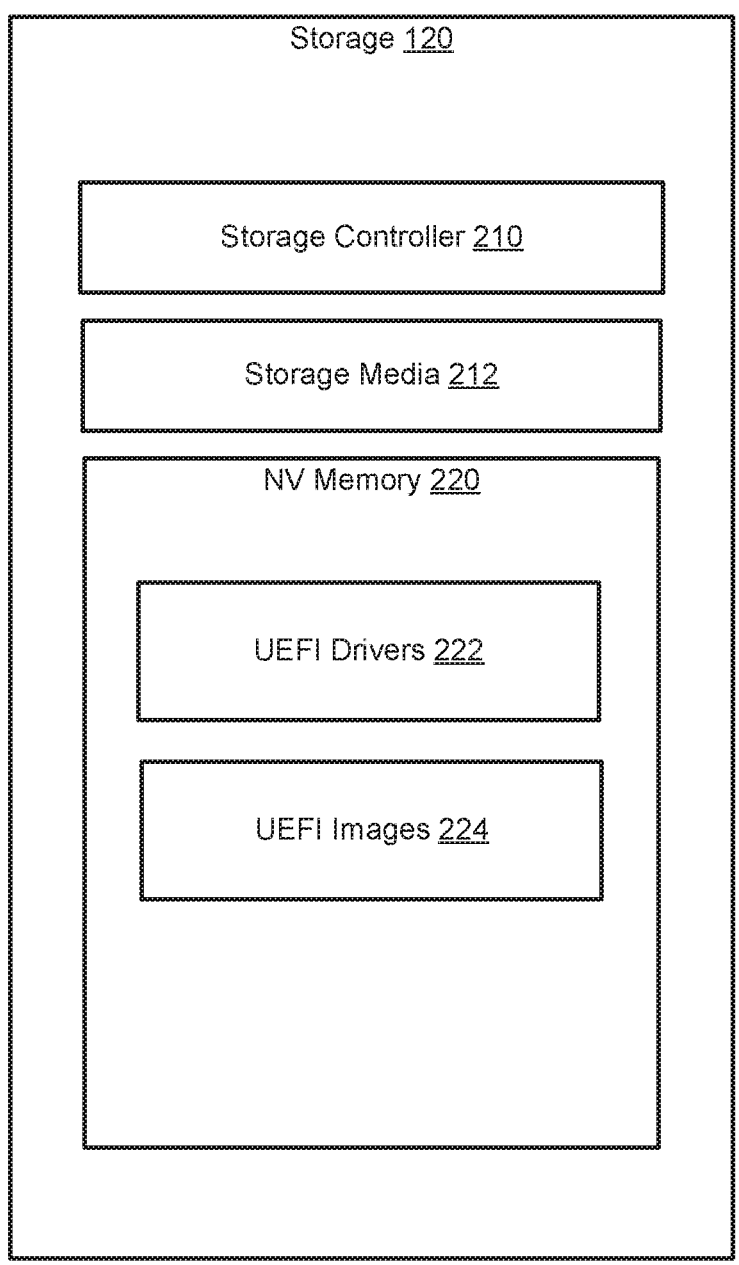
FIG. 2 illustrates example components within an example storage device, in accordance with one embodiment.

In the description of the following figures, reference is also occasionally made to specific components illustrated within the preceding figures, utilizing the same reference numbers from the earlier figures. With reference now to FIG. 2, one embodiment of storage 120 of IHS 100 is shown. Storage 120 includes storage controller 210, storage media 212, and non-volatile (NV) memory 220. Storage controller 210 can manage and control the operation of storage 120. Storage media 212 can include hard drives or solid-state drives. NV memory 220 is a data storage device that retains its stored data even when electrical power is removed. In the illustrated embodiment, NV memory 220 is separate from NV memory 139. In another embodiment, NV memory 220 includes NV memory 139. As illustrated, NV memory 220 can contain UEFI device driver 222 which can be loaded into system memory 114 during start-up or booting of IHS 100 in order to facilitate the operation of storage 120 within IHS 100.

Figure 3:
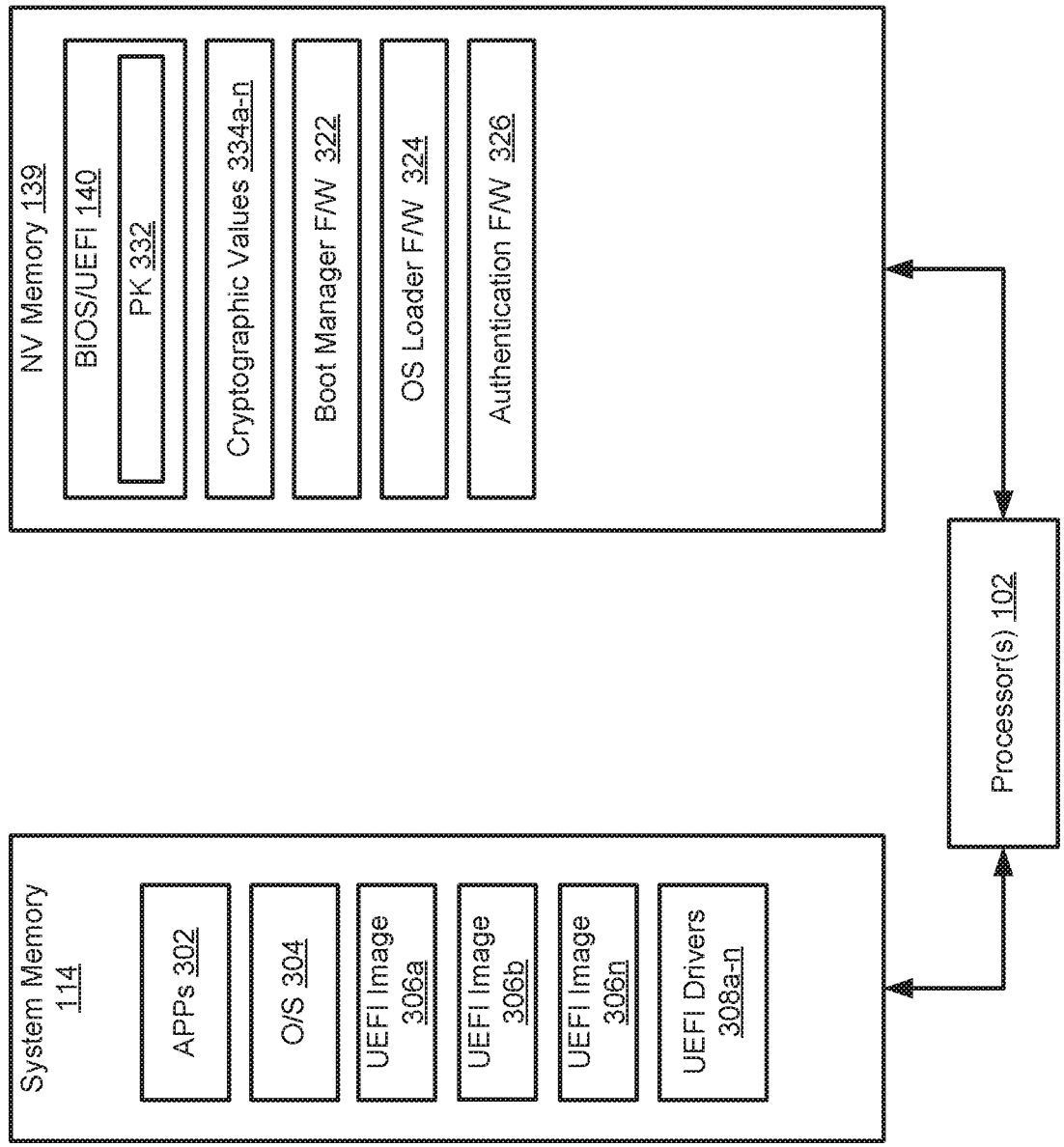
FIG. 3 illustrates example contents of a system memory and a non-volatile storage device in an IHS, according to one or more embodiments.

With reference now to FIG. 3, there is shown the contents of example contents of system memory 114 and NV memory 139 of IHS 100, in accordance with one or more embodiments. System memory 114 includes data, software, and/or firmware modules, including application(s) 302, operating system (O/S) 304, UEFI images 306a-n, and UEFI drivers 308a-n. In one or more embodiments, system memory includes an image/boot loader that has been verified to be authentic. UEFI images 306a-n may be loaded from NV memory 139 into system memory 114 in response to being authenticated/verified by the image/boot loader, as described in greater detail below. System memory 114 can also include other data, software, and/or firmware modules. UEFI images 306a-n are images that may be loaded onto IHS 100. UEFI drivers 308a-n are program modules executable by processor 102 that are loaded during booting of OS 304 onto IHS 100 to facilitate communications and operation of specific devices and/or hardware components of IHS 100. In another embodiment, OS 304 is included within at least one of UEFI images 306a-n.

NV memory 139 includes BIOS/UEFI 140, boot manager F/W 322, and cryptographic values 334a-n. Boot manager F/W 322 operates during the device execution phase (DXE) of booting and facilitates the loading of UEFI images 306a-n and UEFI drivers 308a-n. BIOS/UEFI 140 also includes platform key (PK) 332. PK 332 is a key that is written to the firmware during an initial setup/boot of IHS 100. After PK 332 has been written, secure boot utilizes a "User" mode during which all drivers and loaders must be signed with PK 332 in order to be loaded by BIOS/UEFI 140 firmware. BIOS/UEFI 140 can also include one or more private key databases (not illustrated), including, but not limited to: key exchange key (KEK) database, an authorization signature database (Db), and a forbidden signatures database (Dbx). NV memory 139 also includes cryptographic values 334a-n. Cryptographic values 334a-n are unique values that are associated with UEFI images and drivers and which may be used to authenticate a corresponding UEFI image or driver prior to a reboot of IHS 100. In one embodiment, cryptographic values 334a-n are checksum hash values that are generated by performing a hash function on a UEFI image or driver. These cryptographic values 334a-n can be used to uniquely identify a corresponding UEFI image or driver. In one embodiment, the hash function can be a secure hash function such as the Secure Hash Algorithm-1 (SHA-1) or Secure Hash Algorithm-2 (SHA-2) hash functions. In another embodiment, cryptographic values 334a-n are unique cryptographic signatures associated with a corresponding one of UEFI images 306a-n. In still another embodiment, cryptographic values 334a-n are cryptographic keys. According to one aspect of the disclosure, cryptographic values 334a-n are utilized by processor 102 and/or BMC 144 during a boot of IHS 100 to authenticate a requested boot image (e.g., UEFI image 306b). During the authentication, boot manager F/W 322 performs a pre-authentication process to determine whether the requested boot image is authentic before allowing the boot path to be updated to utilize the requested boot image. In response to the new UEFI image being authenticated, the pointer of the image/boot loader or boot manager is modified to point to the new UEFI image and a re-boot of the IHS is triggered. During the subsequent boot, the new UEFI image is accessed and loaded for operation of the IHS. According to another aspect of the disclosure, cryptographic values 334a-n are utilized by processor 102 and/or BMC 144 during runtime to authenticate a requested boot image. In response to the new UEFI image being authenticated, the boot path to be updated to utilize the requested boot image and a re-boot of IHS 100 is triggered. During the subsequent boot, the new UEFI image is accessed and loaded for operation of IHS 100. In one embodiment, a cryptographic value (e.g., cryptographic value 334a) associated with a particular UEFI image (e.g., UEFI image 306a) is automatically accessed/retrieved from a database and/or remote computing system in response IHS 100 receiving a request/command to update a boot path to utilize that particular image.

NV memory 139 further includes OS loader F/W 324 and authentication F/W 326. Boot manager F/W 322 operates during the device execution phase (DXE) of booting and facilitates the loading of UEFI images 306a-n and UEFI drivers 308a-n. OS loader F/W 324 operates during the transient system load phase of booting and facilitates the loading of OS 304. In one embodiment, authentication F/W 326 executes on processor 102 and/or BMC 144 during the DXE phase to facilitate the verification of a next boot image and updating of a current boot path to utilize the next boot image. In another embodiment, authentication F/W 326 operates during runtime to facilitate the authentication of a next boot image and updating of a current boot path to utilize the next boot image. Authentication F/W 326 performs the processes presented in the flowcharts of FIG. 5.

Figure 4:
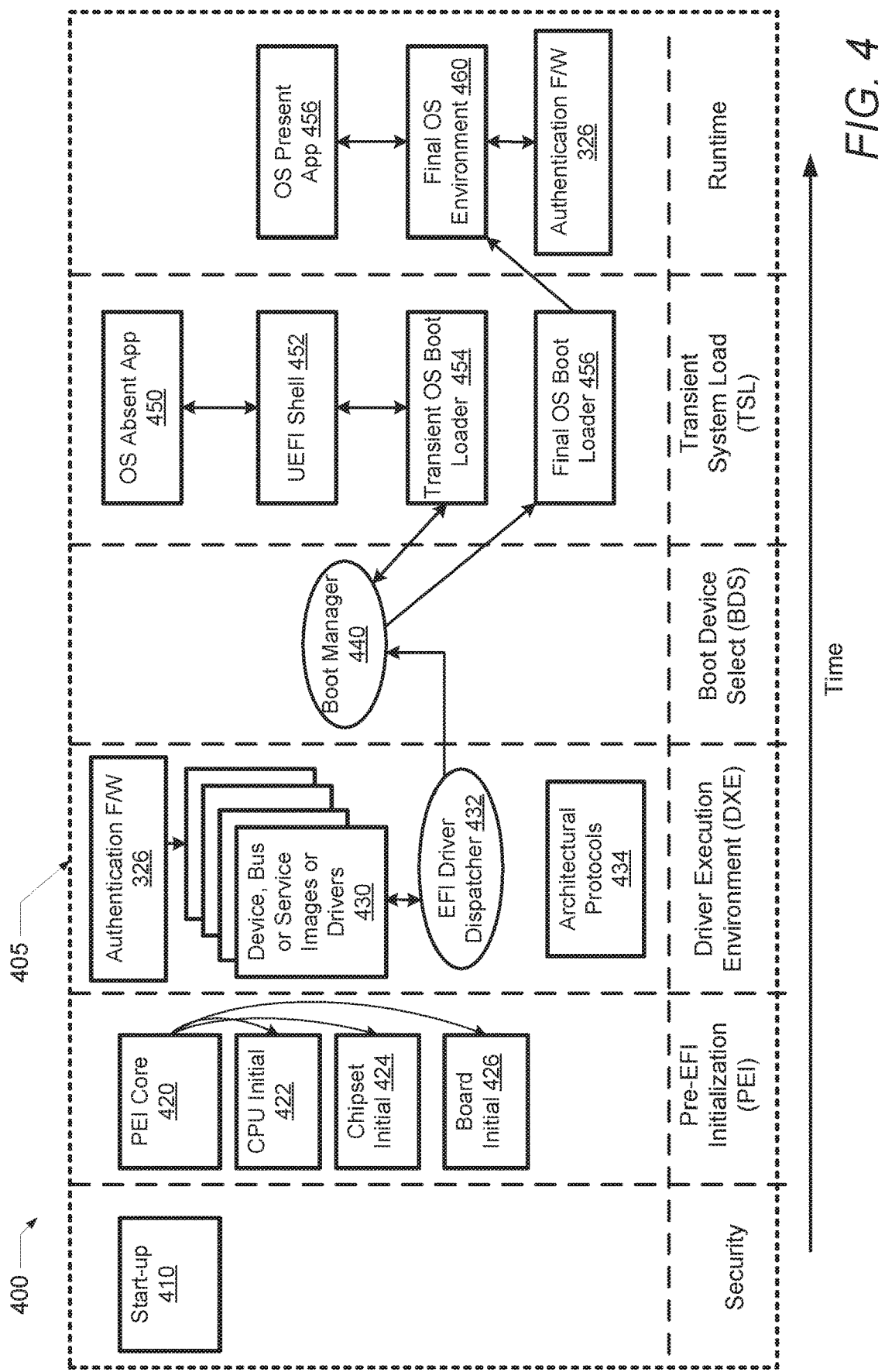
FIG. 4 illustrates a timeline of a boot-up operation for an IHS which includes authenticating a boot path update in an IHS prior to booting a new target image, according to one or more embodiments.

FIG. 4 illustrates a timeline 400 of a boot operation (or boot process) 405 for IHS 100. Timeline 400 includes a security phase, a pre-extensible firmware interface initialization (PEI) phase, a driver execution environment (DXE) phase, a boot device selection (BDS) phase, a transient system load (TSL) phase, and a runtime phase. Timeline 400 begins at start-up 410, which involves a security phase, where processor 102 is initialized. At the PEI phase, a PEI core operation 420 is performed. During the PEI core operation 420, memory is initialized and firmware volume locations are described in hand off blocks. Next, a processor initialization 422 of processor 102 occurs, followed by chipset initialization 424 and then motherboard initialization 426. At a DXE phase, EFI driver dispatcher 432 retrieves device, bus or service images or drivers 430, depending upon architectural protocols 434 associated with IHS 100. During the DXE phase, if a secure boot process or mode is enabled, an authentication check of device, bus or service images or drivers 430 occurs. If the secure boot process or mode is not enabled, an authentication check of device, bus or service images or drivers 430 does not occur during the DXE phase. The secure boot process or policy prevents the loading of drivers or images that are not signed with an acceptable digital signature. When secure boot is enabled, IHS 100 is initially placed in "setup" mode. During the "setup" mode a platform key (e.g., the PK 332) is written to the firmware. Once the platform key is written, secure boot enters "User" mode. During the "user" mode all drivers and loaders to be loaded must be signed with the authorized platform key.

In one embodiment, authentication F/W 326 executes on BMC 144 and/or processor 102 during the DXE phase after a boot process of a UEFI image associated with the current boot path (e.g., UEFI image 306a), has been initialized by an image loader of IHS 100. During the DXE phase, BMC 144 detects an attempt to update a boot path that points to the first UEFI image and that is utilized by the image loader. For example, the attempt to update the boot path may include a request to switch to a new image following a software/firmware update. In another example, the attempt to update the boot path is an authentication failure of the UEFI image currently associated with the current boot path. In still another embodiment, the attempt to update the boot path involves BMC 144 (or processor 102) identifying a request received from a user of IHS 100 via an input device, such as keyboard 118. In this embodiment, the request may include, for example, a request from a user to rollback the UEFI image associated with the current boot path to an earlier version. In response to detecting the attempt to update the boot path, BMC 144 identifies, from the request, a second (target) UEFI image (e.g., UEFI image 306b) that is to be used to replace the first UEFI image (e.g., UEFI image 306a) in the boot path. In one or more embodiments, the image loader is a secure boot image loader. In another one or more embodiments, the image loader includes Boot Manager F/W 322, OS boot loader 454, and/or final OS boot loader 456. While the target image is described as a UEFI image, in other embodiments, the target image may be a non-UEFI image, such as an image of a BMC or RAC.

The authentication of the new UEFI image occurs during a next boot-up of IHS 100. In one or more embodiments, in response to identifying the request, BMC 144 triggers a reboot of the system. During the DXE phase of the next boot of IHS 100 the boot path is initiated using the original UEFI image (e.g., UEFI image 306a). The boot/image loader then performs a secure authentication process on the new UEFI image (e.g., UEFI image 306b) using a corresponding cryptographic value (e.g., cryptographic value 334a). In one embodiment, during the pre-authentication process, BMC 144 and/or processor 102 retrieves the cryptographic value (e.g., cryptographic value 334b) corresponding to the second image (e.g., UEFI image 306b) from a known trusted location or trusted provider. In one embodiment, the trusted location is a server that is remotely accessible to IHS 100. In another embodiment, the trusted location is a secure storage within IHS 100 that is protected from intentional or unintentional write access, such as a read-only memory (ROM). For example, BMC 144 retrieves or receives a SHA-1 cryptographic value 334a that was previously calculated by a trusted provider, enterprise, or manufacturer based on a known "good" version of the second image. In another example, IHS 100 receives the cryptographic value 334a as part of an update from an original equipment manufacturer (OEM) of IHS 100.

In another embodiment, a cryptographic value (e.g., cryptographic value 334b) that is generated using a cryptographic algorithm from a known "good" version of an image (UEFI image 306b) may be appended to (or included within) that image. In this embodiment, BMC 144 retrieves the cryptographic value of that image (UEFI image 306b). BMC 144 may then apply, to the UEFI image 306b, a same cryptographic algorithm (e.g., a SHA-1 cryptographic hash function) that was originally used to calculate cryptographic value 334b to generate a second cryptographic value. The second cryptographic value is then compared to the retrieved cryptographic value (cryptographic value 334b). If the comparison indicates an identical match, BMC 144 authenticates the second image. In another embodiment, during the pre-authentication process, BMC 144 retrieves a private cryptographic key from a known trusted location or trusted provider associated with the second image. In one embodiment, the cryptographic key may be stored within at least one authorization database of IHS 100. BMC 144 performs a validation of a cryptographic signature of the second image using the private cryptographic key and cryptographic algorithm associated with the private cryptographic key signature. In response to the result of the validation authorizing the cryptographic key, BMC 144 authenticates the second image. In another embodiment, the second boot image may initially be encrypted by an encrypting entity (e.g., a server or service provider) that utilizes a public key and is authenticated by decrypting the second image at IHS 100 via a private cryptographic key. Alternatively, the second image may initially be encrypted by an encrypting entity that utilizes a private key and is authenticated by decrypting the second image at IHS 100 via the public cryptographic key. It should be noted that in one or more embodiments, BMC 144 performs the pre-authentication process via a non-updateable firmware entity, such as a signed bootloader.

In response to the new UEFI image being successfully authenticated, the pointer of the image/boot loader is modified to point to the new UEFI image. The image/boot loader then triggers a re-boot of IHS 100, during which the boot path is initiated with the new UEFI image. The new UEFI image is then accessed and loaded for operation on IHS 100.

In response to authenticating the second image, the image/boot loader is modified such that the image loader points to the second image (which identifies the second image as the primary boot option). Thus, the current boot path is updated during the DXE phase prior to attempting to switch bootable images by the boot/image loader during a next booting of IHS 100. In response to updating the current boot path, BMC 144 triggers a reboot of IHS 100. During the subsequent initialization/booting of IHS 100, the image loader then automatically utilizes the updated boot path pointing to the second image.

In response to being unable to authenticate the second image, BMC 144 issues a notification, such as an error message that indicates that the authentication of the second boot image has failed and/or that the updating of the current boot path has failed, to an error log and/or at least one output device (e.g., a monitor). In one embodiment, the detected failure may also be recorded to memory (e.g., NV Memory 139) for future reference/access. BMC 144 further prevents any updating of the current boot path to utilize the second boot image, and IHS 100 continues to the BDS phase. It should also be noted that in one or more embodiments, the successful authentication of the second boot image is a prerequisite for updating the current boot path.

EFI driver dispatcher 432 transmits device, bus or service images or drivers 430 to boot manager 440 during the BDS phase. At the TSL phase, either transient OS boot loader 454 or final OS boot loader 456 loads device, bus or service images or drivers 430 to start OS 304. If transient OS boot loader 454 is selected to run, then IHS 100 enters a UEFI shell environment 452 and triggers OS absent application 450 to run. If final OS boot loader 456 is selected to run, IHS 100 loads OS 304, enters the final OS environment 460, and triggers OS present application 456 to run during the runtime phase.

In another embodiment, authentication F/W 326 executes on BMC 144 during the runtime phase after a first UEFI image (e.g., UEFI image 306a) has been booted by an image loader of IHS 100. During the runtime phase, BMC 144 detects an attempt to update a boot path that points to the first UEFI image and that is utilized by the image loader. In one embodiment, the attempt to update the current boot path originates from within a program/utility, and/or operating system executing on IHS 100. For example, the request may include, for example, a request to update firmware that is generated by an update utility of a current operating system. In another embodiment, the attempt to update the boot path involves BMC 144 (or processor 102) identifying a request received from a user of IHS 100 via an input device, such as keyboard 118. In response to detecting the attempt to update the boot path, BMC 144 identifies a second (target) UEFI image (e.g., UEFI image 306b) that is to be used to replace the first UEFI image (e.g., UEFI image 306a) in the boot path. In one or more embodiments, the request to update the boot path identifies the second UEFI image. For example, the request may include, for example, a request to update firmware or to roll back firmware to a previous version. In another example, the request is a request to perform a dynamic check of the authenticity of the currently running UEFI image. In one or more embodiments, the image loader is a secure boot image loader. In another one or more embodiments, the image loader includes Boot Manager F/W 322, transient OS boot loader 454 and/or final OS boot loader 456.

In response to identifying the request, BMC 144 initializes pre-authentication process to authenticate the second boot image (e.g., UEFI image 306b) using a corresponding cryptographic value (e.g., cryptographic value 334a), as described above. In response to the new UEFI image being successfully authenticated, the pointer of the image/boot loader is modified to point to the new UEFI image. Thus, the current boot path is updated at runtime of the first boot image and prior to attempting to switch bootable images by the boot/image loader during a next booting of IHS 100. In response to updating the current boot path, BMC 144 triggers a reboot of IHS 100. During the subsequent initialization/booting of IHS 100, the image loader then utilizes the updated boot path pointing to the second image. In one embodiment, BMC 144 triggers the reboot immediately after authorizing the second image and updating the current boot path. In another embodiment, the reboot may be delayed by an amount of time (which can be predetermined or may be established by user input). In still another embodiment, in lieu of rebooting IHS 100, BMC 144 issues, to at least one output device, a notification that requests a user to manually initialize the rebooting of IHS 100. In response to rebooting IHS 100, the image loader automatically initializes the current boot path, which now utilizes the second image as the primary boot image.

In response to being unable to authenticate the second image, BMC 144 issues a notification, such as an error message that indicates that the authentication of the second boot image has failed and/or that the updating of the current boot path has failed, to an error log and/or at least one output device (e.g., a monitor). In one embodiment, the detected failure may also be recorded to memory (e.g., NV Memory 139) for future reference/access. BMC 144 further prevents any updating of the current boot path to utilize the second boot image, and the IHS continues to operate in the initial/ first boot image. It should also be noted that in one or more embodiments, the successful authentication of the second boot image is a prerequisite for updating the current boot path.

Figure 5:
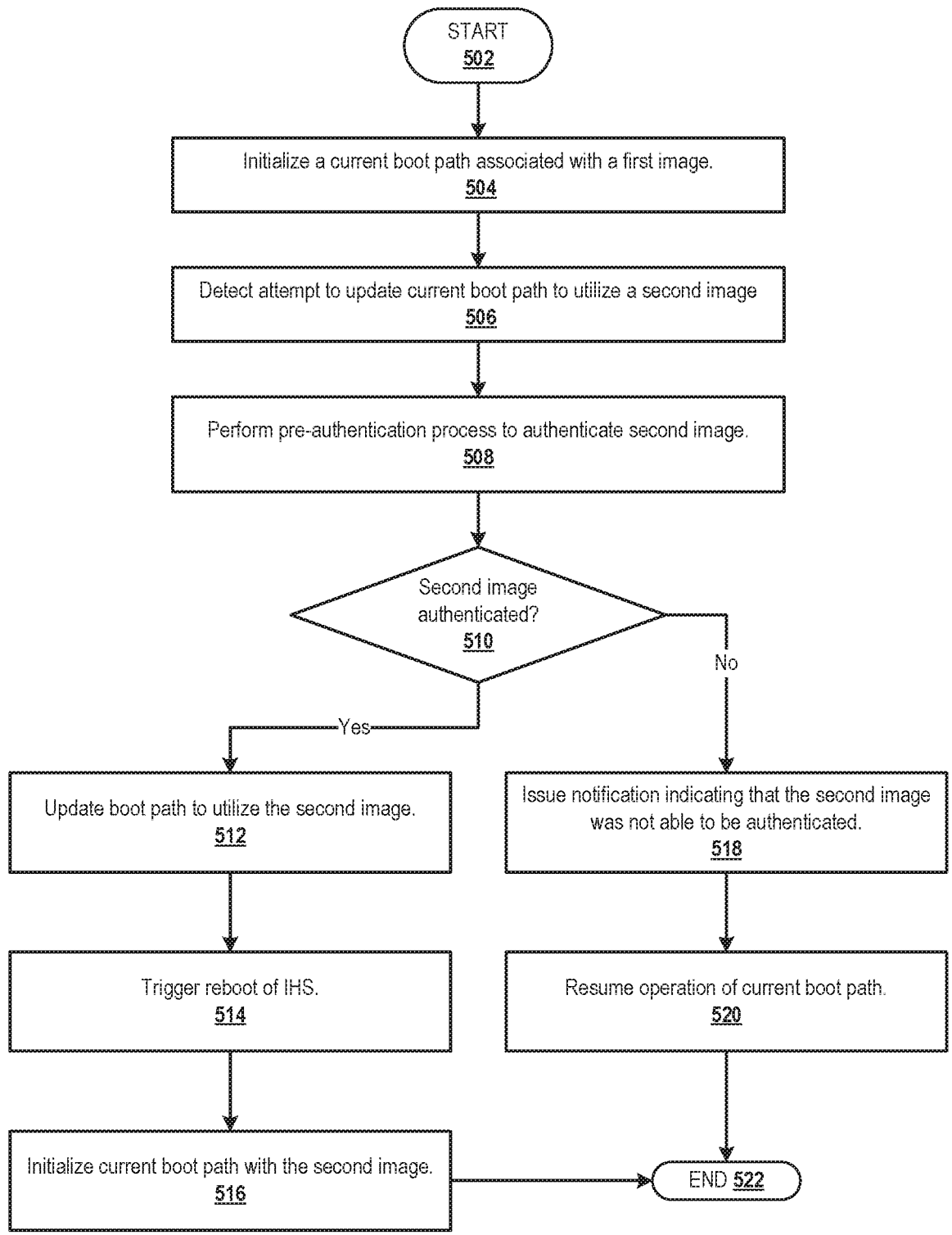
FIG. 5 is a flow chart illustrating one example of a method for authenticating a boot path update in an IHS prior to booting a new target image, according to one or more embodiments.

FIG. 5 illustrates a flowchart of exemplary method 500 by which BMC 144 within the preceding figures performs different aspects of the processes that enable the one or more embodiments of the disclosure. Generally, method 500 represents a method for authenticating a boot path update. The description of method 500 is provided with general reference to the specific components illustrated within the preceding FIGS. 1-4. Generally, method 500 is described as being implemented via BMC 144 and particularly the execution of code provided by authentication F/W 326 acting within BMC 144. It is however appreciated that certain aspects of the described methods may be implemented via other processing devices and/or execution of other code. For example, in another embodiment, the methods described herein may be performed by an image loader.

Method 500 may be performed during a DXE phase and/or a runtime phase of IHS 100. Referring to the flow chart of FIG. 5, method 500 begins at start block 502 and proceeds to block 504 where processor 102 initializes a current boot path associated with a first image. BMC 144 detects an attempt to update the current boot path to utilize a second image (block 506). At block 508, BMC 144 performs a pre-authorization process to authenticate the second image. BMC 144 then determines whether the second image was authenticated successfully (block 510).

In response to successfully authenticating the second image, BMC 144 updates the current boot path to utilize the second image (block 512). At block 514, BMC 144 triggers a reboot of IHS 100. During the subsequent booting, the image loader of IHS 100 then initializes the current boot path with the second image (block 516). Method 500 then terminates at block 522.

In response to determining that the authentication of the second image has failed, BMC 144 issues a notification to at least one of an error log and at least one output device which indicates that the second image was not able to be authenticated (block 518). At block 520, the operation of the current boot path is resumed. For example, if the attempt to update the boot path was received during booting of IHS 100 (e.g., during the DXE phase) and the authentication of the second image has failed, IHS 100 continues booting of the current boot path using the first image (and the reboot of IHS 100 is not triggered). In another example, if the attempt to update the boot path was received during runtime and the authentication of the second image has failed, IHS 100 continues to operate using the first image (and the reboot of IHS 100 is not triggered). Method 500 then terminates at block 522.

In the above described flow chart, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:
   initializing, by an image loader of an information handling system (IHS), a current boot path associated with a first image;
   detecting, by a processor of the IHS, an attempt to update the current boot path to utilize a second image that is different from the first image;
   in response to detecting the attempt to update the current boot path, initializing a pre-authentication process to authenticate the second image, wherein the pre-authentication process is performed during a device execution phase (DXE) of the current boot path; and
   in response to authenticating the second image, updating the current boot path to point to the second image, and enabling a subsequent boot of the IHS using the second image, wherein a successful authentication of the second image is a prerequisite for updating the current boot path from the first image, and the boot process of the IHS defaults to utilizing the first image during the boot phase prior to performing the authentication of the second image.

2. The method of claim 1, further comprising:
   in response to the pre-authentication process failing to authenticate the second image, preventing an update of the current boot path.

3. The method of claim 1, further comprising:
   in response to updating the current boot path to utilize the second image:
      triggering a reboot of the IHS; and
      initializing, by the image loader, the current boot path with the second image.

4. The method of claim 1, wherein authenticating the second image further comprises:
   retrieving a cryptographic signature associated with the second image;
   retrieving a trusted cryptographic key stored within at least one authorization database;
   performing a validation of the cryptographic signature by applying a cryptographic algorithm and the trusted cryptographic key to the cryptographic signature; and
   in response to the validation authenticating the cryptographic signature, authenticating the second image, wherein the second image is authenticated prior to updating the current boot path.

5. The method of claim 1, wherein authenticating the second image further comprises:
   retrieving a first cryptographic signature associated with the second image;
   applying a cryptographic algorithm to the second image to generate a second cryptographic signature;
   comparing the first cryptographic signature to the second cryptographic signature; and
   in response to the comparison indicating that the first cryptographic signature and the second cryptographic signature are identical, authenticating the second image, wherein the second image is authenticated prior to updating the current boot path.

6. The method of claim 1, wherein the pre-authentication process is performed at runtime of the first image.

7. The method of claim 1, wherein the pre-authentication process is performed by a non-updatable firmware entity.

8. The method of claim 7, wherein the non-updatable firmware entity is a signed bootloader.

9. The method of claim 1, wherein the image loader is a secure boot image loader.

10. An information handling system (IHS) comprising:
    a memory having a plurality of images including a first image;
    an image loader that initializes a current boot path associated with the first image; and
    a processor that:
       detects an attempt to update the current boot path to utilize a second image that is different from the first image;
       in response to detecting the trigger, initializes a pre-authentication process to authenticate the second image, wherein the pre-authentication process is performed during a device execution phase (DXE) of the current boot path; and
       in response to authenticating the second image, updates the current boot path to point to the second image, and enabling a subsequent boot of the IHS using the second image, wherein a successful authentication of the second image is a prerequisite for updating the current boot path from the first image, and the boot process of the IHS defaults to utilizing the first image during the boot phase prior to performing the authentication of the second image.

11. The IHS of claim 10, wherein the processor, in response to the pre-authentication process failing to authenticate the second image, prevents an update of the current boot path.

12. The IHS of claim 10, wherein:
- the processor, in response to updating the current boot path to utilize the second image, triggers a reboot of the IHS; and
- the image loader initializes the current boot path with the second image.

13. The IHS of claim 10, wherein in authenticating the second image, the processor:
- retrieves a cryptographic signature associated with the second image;
- retrieves a trusted cryptographic key stored within at least one authorization database;
- performs a validation of the cryptographic signature by applying a cryptographic algorithm and the trusted cryptographic key to the cryptographic signature; and
- in response to the validation authenticating the cryptographic signature, authenticates the second image, wherein the second image is authenticated prior to updating the current boot path.

14. The IHS of claim 10, wherein in authenticating the second image, the processor:
- retrieves a first cryptographic signature associated with the second image;
- applies a cryptographic algorithm to the second image to generate a second cryptographic signature;
- compares the first cryptographic signature to the second cryptographic signature; and
- in response to the comparison indicating that the first cryptographic signature and the second cryptographic signature are identical, authenticates the second image, wherein the second image is authenticated prior to updating the current boot path.

15. The IHS of claim 10, wherein the pre-authentication process is performed at runtime of the first image.

16. The IHS of claim 10, wherein the pre-authentication process is performed by a non-updatable firmware entity.

17. The IHS of claim 16, wherein the non-updatable firmware entity is a signed bootloader.

18. The IHS of claim 10, wherein the image loader is a secure boot image loader.

* * * * *